US012640367B2

(12) United States Patent
Kanai et al.

(10) Patent No.: US 12,640,367 B2
(45) Date of Patent: May 26, 2026

(54) POSITIVE-ELECTRODE ACTIVE MATERIAL FOR NONAQUEOUS-ELECTROLYTE SECONDARY CELL, AND NONAQUEOUS-ELECTROLYTE SECONDARY CELL

(71) Applicant: Panasonic Intellectual Property Management Co., Ltd., Osaka (JP)

(72) Inventors: Toshinobu Kanai, Hyogo (JP); Takeshi Ogasawara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 558 days.

(21) Appl. No.: 18/021,462

(22) PCT Filed: Jun. 14, 2021

(86) PCT No.: PCT/JP2021/022505
§ 371 (c)(1),
(2) Date: Feb. 15, 2023

(87) PCT Pub. No.: WO2022/044489
PCT Pub. Date: Mar. 3, 2022

(65) Prior Publication Data
US 2023/0290941 A1 Sep. 14, 2023

(30) Foreign Application Priority Data
Aug. 25, 2020 (JP) ................................. 2020-141799

(51) Int. Cl.
*H01M 4/485* (2010.01)
*H01M 4/02* (2006.01)
(Continued)

(52) U.S. Cl.
CPC ........... *H01M 4/485* (2013.01); *H01M 4/505* (2013.01); *H01M 4/525* (2013.01); *H01M 2004/028* (2013.01)

(58) Field of Classification Search
CPC ...................................................... H01M 4/485
See application file for complete search history.

(56) References Cited

U.S. PATENT DOCUMENTS

2008/0090150 A1 4/2008 Nakura
2009/0081547 A1 3/2009 Nakura
(Continued)

FOREIGN PATENT DOCUMENTS

EP 3883020 A1 * 9/2021 ............ H01M 4/364
JP 2006-302880 A 11/2006
(Continued)

OTHER PUBLICATIONS

International Search Report dated Jul. 27, 2021, issued in counterpart International Application No. PCT/JP2021/022505 (2 pages).

*Primary Examiner* — Brian R Ohara
(74) *Attorney, Agent, or Firm* — WHDA, LLP

(57) ABSTRACT

A positive-electrode active material includes a lithium transition metal composite oxide that contains at least 80 mol % of Ni in relation to the total molar amount of metal elements excluding Li. The lithium transition metal composite oxide includes secondary particles obtained by the aggregation of primary particles, at least one element A selected from Ca and Sr being present on the surface of the primary particles in an amount of 1 mol % or less in relation to the total molar amount of metal elements excluding Li, and S and at least one element B selected from Zr, Ti, Mn, Er, Pr, In, Sn, and Ba being present on the surface of the secondary particles.

12 Claims, 2 Drawing Sheets

(51) Int. Cl.
　　　*H01M 4/505*　　　　(2010.01)
　　　*H01M 4/525*　　　　(2010.01)

(56) References Cited

U.S. PATENT DOCUMENTS

2009/0081548 A1　　3/2009　Nakura
2021/0408528 A1*　12/2021　Chae ...................... C01G 53/04

FOREIGN PATENT DOCUMENTS

JP　　　2006-351378 A　　12/2006
JP　　　2007-18985 A　　　1/2007
JP　　　2010-40383 A　　　2/2010

* cited by examiner

POSITIVE-ELECTRODE ACTIVE MATERIAL FOR NONAQUEOUS-ELECTROLYTE SECONDARY CELL, AND NONAQUEOUS-ELECTROLYTE SECONDARY CELL

CROSS-REFERENCE TO RELATED APPLICATION

This application is a National Phase Application filed under 35 U.S.C. § 371 of International Application No. PCT/JP2021/022505 filed on Jun. 14, 2021 which claims the benefit of priority under 35 U.S.C. § 119 (a) of Japanese Patent Application No. 2020-141799 filed in Japan on Aug. 25, 2020, the contents of which are incorporated herein by reference.

TECHNICAL FIELD

The present disclosure relates to a positive electrode active material for a non-aqueous electrolyte secondary battery and a non-aqueous electrolyte secondary battery using the positive electrode active material.

BACKGROUND ART

In a non-aqueous electrolyte secondary battery such as a lithium-ion battery, a positive electrode active material significantly affects battery performance such as input-output characteristics, a capacity, cycle characteristics, and storage characteristics. For the positive electrode active material, a lithium-transition metal composite oxide containing metal elements such as Ni, Co, Mn, and Al, and composed of secondary particles each formed by aggregation of primary particles is commonly used. Since the positive electrode active material has much different properties depending on its composition, particle shape, and the like, many investigations have been made on various positive electrode active materials.

For example, Patent Literature 1 discloses a method for manufacturing a positive electrode active material including: adhering tungsten oxide and at least one selected from the group consisting of a sulfate compound, a nitrate compound, a borate compound, and a phosphate compound to particle surfaces of a lithium-transition metal composite oxide containing Ni; and heat-treating the composite particles under an oxygen atmosphere.

CITATION LIST

Patent Literature

PATENT LITERATURE 1: Japanese Unexamined Patent Application Publication No. 2010-040383

SUMMARY

Although a lithium-transition metal composite oxide with a high Ni content is promising as a positive electrode active material that contributes to a higher capacity of a battery, a non-aqueous electrolyte secondary battery using this composite oxide has the following problem: a non-aqueous electrolyte is easily decomposed dining storage with charged to generate gas. In the art disclosed in Patent Literature 1, unfortunately, increased Ni content rate in the positive electrode active material causes cation mixing, which easily results in decreased initial capacity.

A positive electrode active material for a non-aqueous electrolyte secondary battery of an aspect of the present disclosure includes a lithium-transition metal composite oxide containing 80 mol % or more of Ni based on a total amount of moles of metal elements excluding Li, wherein the lithium-transition metal composite oxide includes secondary particles formed by aggregation of primary particles, at least one element A selected from the group consisting of Ca and Sr is present on surfaces of the primary particles in an amount of 1 mol % or less based on the total amount of moles of the metal elements excluding Li, and at least one element B selected from the group consisting of Zr, Ti, Mn, Er, Pr, In, Sn, and Ba; and S are present on surfaces of the secondary particles.

A non-aqueous electrolyte secondary battery of an aspect of the present disclosure comprises a positive electrode including the above positive electrode active material, a negative electrode, and a non-aqueous electrolyte.

According to an aspect of the present disclosure, gas generation during storage with charged may be inhibited in the non-aqueous electrolyte secondary battery using the positive electrode active material with a high Ni content. Using the positive electrode active material of an aspect of the present disclosure may provide, for example, a non-aqueous electrolyte secondary battery having a high capacity and excellent storage characteristics.

DESCRIPTION OF EMBODIMENTS

Figure 1:
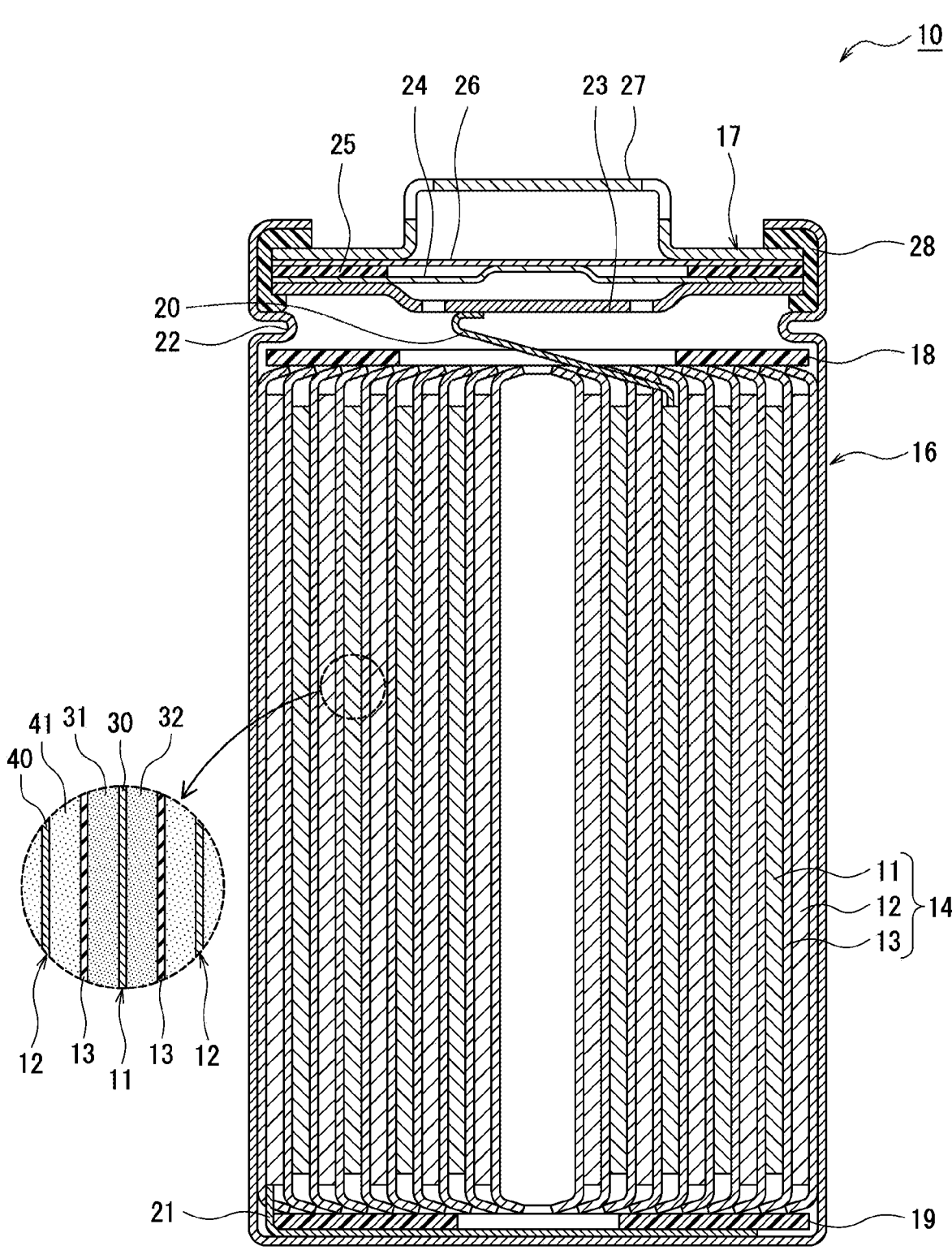
FIG. 1 is a sectional view of a non-aqueous electrolyte secondary battery of an example of an embodiment.

As described above, the lithium-transition metal composite oxide with a high Ni content is a useful positive electrode active material that contributes to higher capacity and higher energy density of the battery. However, in contradiction, such a lithium-transition metal composite oxide has a problem of accelerating decomposition of a non-aqueous electrolyte during storage of a charged battery to generate a larger amount of gas.

The present inventors have intensively investigated to solve this problem, and as a result, have found that, in a lithium-transition metal composite oxide (positive electrode active material) with a high Ni content, a predetermined amount of at least one of Ca and Sr (element A) present on surfaces of primary particles and predetermined amounts of at least one selected from the group consisting of Zr, Ti, Mn, Er, Pr, In, Sn, and Ba (element B) and S present on surfaces of secondary particles specifically inhibit the gas generation during storage of a charged battery.

It is considered that the positive electrode active material with a high Ni content easily causes a decomposition reaction of the non-aqueous electrolyte by activating the particle surfaces particularly under a high-temperature atmosphere and with a high charge rate. Thus, the non-aqueous electrolyte secondary battery using the positive electrode active material with a high Ni content generates a larger amount of gas during storage with charged. The positive electrode active material according to the present disclosure forms a stable protecting layer on surfaces the secondary particle of the composite oxide by interaction with presence of the element A, the element B, and S, resulting in improvement in the stability of the active material surface. It is considered that this improvement inhibits the decomposition reaction of the electrolyte on the active material surface to remarkably reduce an amount of the generation gas during storage with charged.

If the element A, the element B, or S is absent, the stable protecting layer is not formed on the active material surface, and the effect of the present disclosure is not obtained. As described above, only when all of the element A, the element B, and S are present, the stability of the active material surface is specifically improved to remarkably reduce the gas generation. In addition, the element A, the element B, and S have to be added in appropriate amounts; if the amounts are not strictly controlled, the effect of inhibiting the gas generation is not obtained, and in addition, other battery performances may deteriorate.

Hereinafter, an example of embodiments of the positive electrode active material for a non-aqueous electrolyte secondary battery according to the present disclosure and a non-aqueous electrolyte secondary battery using the positive electrode active material will be described in detail with reference to the drawings. It is anticipated from the beginning to selectively combine a plurality of embodiments and modified examples described below.

Hereinafter, a cylindrical battery in which a wound electrode assembly 14 is housed in a bottomed cylindrical exterior housing can 16 will be exemplified, but an exterior of the battery is not limited to a cylindrical exterior housing can, and may be, for example, a rectangular exterior housing can (rectangular battery), a coin-shaped exterior housing can (coin battery), or an exterior composed of laminated sheets including a metal layer and a resin layer (laminate battery). The electrode assembly may be a laminated electrode assembly in which a plurality of positive electrodes and a plurality of negative electrodes are alternately stacked with a separator interposed therebetween.

FIG. 1 is a sectional view of a non-aqueous electrolyte secondary battery 10 of an example of an embodiment. As illustrated in FIG. 1, the non-aqueous electrolyte secondary battery 10 comprises the wound electrode assembly 14, a non-aqueous electrolyte, and the exterior housing can 16 housing the electrode assembly 14 and the non-aqueous electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metallic container having an opening at one side in an axial direction, and the opening of the exterior housing can 16 is sealed with a sealing assembly 17. Hereinafter, for convenience of description, the sealing assembly 17 side of the battery will be described as the upper side, and the bottom side of the exterior housing can 16 will be described as the lower side.

All of the positive electrode 11, negative electrode 12, and separator 13 that constitute the electrode assembly 14 have an elongated band-shape, and are spirally wound to be alternately stacked in a radial direction of the electrode assembly 14. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). Two separators 13 are formed to be one size larger than at least the positive electrode 11, and disposed to, for example, sandwich the positive electrode 11. The electrode assembly

14 has a positive electrode lead 20 connected to the positive electrode 11 by welding or the like, and a negative electrode lead 21 connected to the negative electrode 12 by welding or the like.

Insulating plates 18 and 19 are disposed on the upper and lower sides of the electrode assembly 14, respectively. In the example illustrated in FIG. 1, the positive electrode lead 20 extends through a through hole in the insulating plate 18 toward a side of the sealing assembly 17, and the negative electrode lead 21 extends along an outside of the insulating plate 19 toward the bottom side of the exterior housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23, becomes a positive electrode terminal. The negative electrode lead 21 is connected to a bottom inner surface of the exterior housing can 16 by welding or the like, and the exterior housing can 16 becomes a negative electrode terminal.

A gasket 28 is provided between the exterior housing can 16 and the sealing assembly 17 to achieve sealability inside the battery. On the exterior housing can 16, a groove 22 in which part of a side wall thereof projects inside for supporting the sealing assembly 17 is formed. The groove 22 is preferably formed in a circular shape along a circumferential direction of the exterior housing can 16, and supports the sealing assembly 17 with the upper surface thereof. The sealing assembly 17 is fixed on the upper part of the exterior housing can 16 with the groove 22 and with an end of the opening of the exterior housing can 16 caulked to the sealing assembly 17.

The sealing assembly 17 has a stacked structure of the internal terminal plate 23, a lower vent member 24, an insulating member 25, an upper vent member 26, and the cap 27 in this order from the electrode assembly 14 side. Each member constituting the sealing assembly 17 has, for example, a disk shape or a ring shape, and each member except for the insulating member 25 is electrically connected to each other. The lower vent member 24 and the upper vent member 26 are connected at respective central parts thereof, and the insulating member 25 is interposed between the respective circumferential parts of the vent members 24 and 26. If the internal pressure of the battery increases due to abnormal heat generation, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through the cap 27 opening.

Hereinafter, the positive electrode 11, the negative electrode 12, the separator 13, and the non-aqueous electrolyte, particularly a positive electrode active material constituting the positive electrode 11, will be described in detail.

[Positive Electrode]

The positive electrode 11 has a positive electrode core 30 and a positive electrode mixture layer 31 provided on a surface of the positive electrode core 30. For the positive electrode core 30, a foil of a metal stable within a potential range of the positive electrode 11, such as aluminum and an aluminum alloy, a film in which such a metal is disposed on a surface layer thereof, and the like may be used. The positive electrode mixture layer 31 includes a positive electrode active material, a conductive agent, and a binder, and is preferably provided on both surfaces of the positive electrode core 30. The positive electrode 11 may be produced by, for example, applying a positive electrode mixture slurry including the positive electrode active material, the conductive agent, the binder, and the like on the positive electrode core 30, drying and subsequently compressing the applied film to form the positive electrode mixture layers 31 on both the surfaces of the positive electrode core 30.

Examples of the conductive agent included in the positive electrode mixture layer 31 may include a carbon material such as carbon black, acetylene black, Ketjenblack, graphite, and carbon nanotube. Examples of the binder included in the positive electrode mixture layer 31 may include a fluororesin such as polytetrafluoroethylene (PTFE) and polyvinylidene fluoride (PVdF), polyacrylonitrile (PAN), a polyimide resin, an acrylic resin, and a polyolefin resin. With these resins, a cellulose derivative such as carboxymethylcellulose (CMC) or a salt thereof, polyethylene oxide (PEO), and the like may be used in combination.

Figure 2:
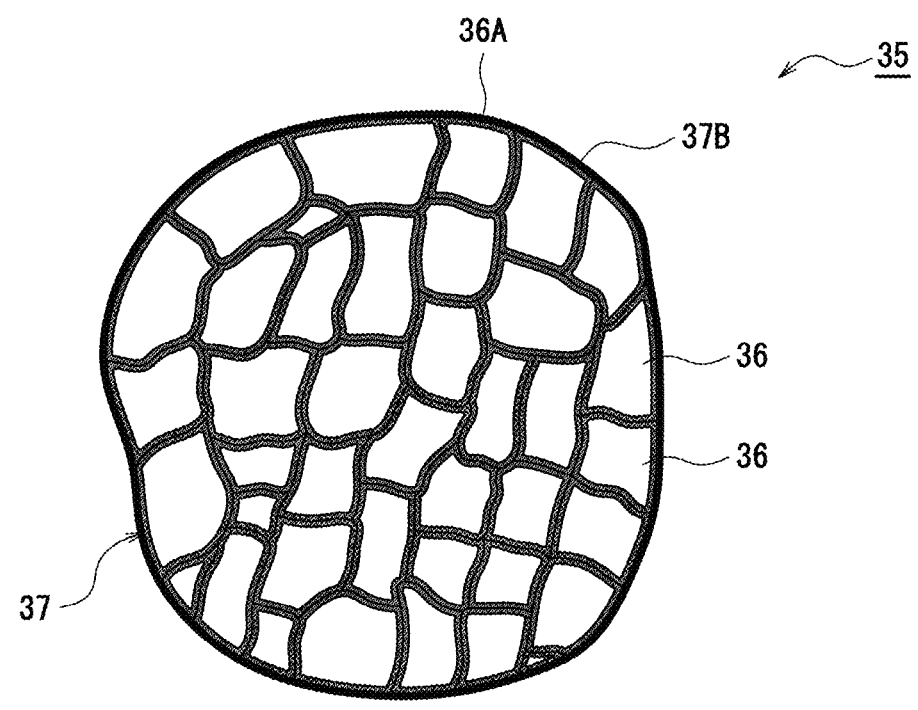
FIG. 2 is a view schematically illustrating a particle cross section of a lithium-transition metal composite oxide constituting a positive electrode active material of an example of an embodiment.

FIG. 2 is a view schematically illustrating a particle cross section of a lithium-transition metal composite oxide 35 constituting the positive electrode active material of an example of an embodiment. The positive electrode active material of the present embodiment includes a lithium-transition metal composite oxide 35 containing 80 mol % or more of Ni based on the total amount of moles of the metal elements excluding Li (hereinafter, referred to as "composite oxide 35"). The composite oxide 35 preferably further contains at least one selected from the group consisting of Co, Al, and Mn. As illustrated in FIG. 2, the composite oxide 35 includes a secondary particle 37 formed by aggregation of primary particles 36.

The composite oxide 35 with a high Ni content is a useful positive electrode active material that contributes to a higher capacity and higher energy density of the battery, as described above. However, there is a problem of a large amount of generation gas during storage of a charged battery. In the composite oxide 35, at least one element A selected from the group consisting of Ca and Sr is present on surfaces of the primary particles 36, and at least one element B selected from the group consisting of Zr, Ti, Mn, Er, Pr, In, Sn, and Ba; and S are present on surfaces of the secondary particles 37. Using this composite oxide 35 for the positive electrode active material may highly inhibit the gas generation during storage with charged.

The positive electrode active material of the present embodiment contains the composite oxide 35 as a main component. Here, the main component means a component with the most mass proportion among materials constituting the positive electrode active material. The positive electrode mixture layer 31 may include a composite oxide other than the composite oxide 35 as the positive electrode active material within a range not impairing the object of the present disclosure, but a proportion of the composite oxide 35 is preferably 50 mass % or more, and more preferably 80 mass % or more. In the present embodiment, the description will be made with the positive electrode active material composed of substantially only the composite oxide 35. The positive electrode active material may be composed of two or more composite oxides 35 having compositions different from each other.

The composite oxide 35 preferably contains another metal element in addition to Li, Ni, and the above elements A, B and S. An example of the other metal elements is Co, Al, Mn, Nb, W, Fe, Zn, Er, K, Pr, Ca, Ba, Sc, Rb, Ga, In, Sn, Sr, or the like. Among them, at least one selected from the group consisting of Co, Al, and Mn is preferably contained. A total amount of the other metal elements contained in the composite oxide 35 is preferably 20 mol % or less, more preferably 15 mol % or less, and for example, 5 mol % or more and 20 mol % or less, based on the total amount of moles of the metal elements excluding Li.

A Ni content of the composite oxide 35 is 80 mol % or more, preferably 85 mol % or more, and more preferably 90 mol % or more based on the total amount of moles of the metal elements excluding Li. An upper limit of the Ni content is, for example, 95 mol %. When the Ni content is within the above range, both of the higher capacity and higher energy density of the battery and the good storage characteristics may be achieved. A preferable composite oxide 35 contains at least one selected from the group consisting of Co, Al, and Mn in an amount of 5 mol % or more and 20 mol % or less in total based on the total amount of moles of the metal elements excluding Li. In this case, the structural stability of the composite oxide 35 increases, which contributes to the improvement in the storage characteristics. The content of each of Al and Mn is, for example, 1 mol % or more and 7 mol % or less.

A Co content of the composite oxide 35 may be less than 5 mol % based on the total amount of moles of the metal elements excluding Li, and the composite oxide 35 may contain substantially no Co. Since Co is rare and expensive, using no Co may reduce the manufacturing cost of the battery. The mole fractions of the elements contained in the composite oxide 35 are measured by inductively coupled plasma mass spectroscopy (ICP-MS).

The composite oxide 35 preferably has a layered rock-salt structure. Examples of the layered rock-salt structure of the composite oxide 35 include a layered rock-salt structure belonging to the space group R-3m and a layered rock-salt structure belonging to the space group C2/m.

As described above, the composite oxide 35 includes the secondary particle 37 formed by aggregation of the primary particles 36. An average particle diameter of the primary particles 36 is, for example, 200 nm or more and 500 nm or less. The average particle diameter of the primary particles 36 is determined by analyzing a scanning electron microscope (SEM) image of a particle cross section observed with an SEM. For example, the positive electrode 11 is embedded into a resin to produce a cross section with cross-section polisher (CP) processing, and this cross section is photographed with the SEM. From the SEM image, 30 primary particles 36 are randomly selected to observe particle boundaries, and each major diameter (the largest major diameter) of the 30 primary particles 36 are determined to specify an average value thereof as the average particle diameter.

A median diameter on a volumetric basis (hereinafter, referred to as "D50") of the secondary particles 37 (composite oxide 35) is, for example, 1 μm or more and 30 μm or less, and preferably 5 μm or more and 20 μm or less. The D50 means a particle diameter at which a cumulative frequency is 50% from a smaller particle diameter side in a particle size distribution on a volumetric basis. The particle size distribution of the secondary particles 37 may be measured by using a laser diffraction-type particle size distribution measuring device (for example, MT3000II, manufactured by MicrotracBEL Corp.) with water as a dispersion medium.

On the surfaces of the primary particles 36 constituting the composite oxide 35, at least one element A selected from the group consisting of Ca and Sr is present in an amount of 1 mol % or less based on the total amount of moles of the metal elements excluding Li. The element A, which is present on the surfaces of the secondary particles 37 and on particle boundaries where the primary particles 36 are contacted with each other, is present on the surfaces of all the primary particles 36 constituting the secondary particles 37 of the composite oxide 35. It is considered that the element A uniformly adheres onto the surfaces of the primary particles 36 in a compound state, and a coating layer 36A including the element A is formed on the surfaces of the primary particles 36. An element distribution on the particle cross section of the composite oxide 35 may be observed by energy dispersive X-ray spectroscopy (TEM-EDX).

The element A, for example, does not form a solid solution with Ni and the like, and is present substantially only on the surfaces of the primary particles 36. Although the element A added even at a small amount interacts with the element B and S to contribute to the inhibition of the gas generation, adding the element A at 0.1 mol % or more based on the total amount of moles of the metal elements excluding Li makes the effect remarkable. Meanwhile, if the content of the element A is more than 3 mol %, the coating layer 36A including the element A becomes a resistant layer, which lowers the discharge capacity.

The content of the element A is needed to be controlled to 3 mol % or less based on the total amount of moles of the metal elements excluding Li, and more preferably 0.7 mol % or less, and particularly preferably 0.5 mol % or less. A lower limit of the content of the element A is preferably 0.15 mol %, more preferably 0.20 mol %, and particularly preferably 0.25 mol %, from the viewpoint of achievement of both the higher capacity and good storage characteristics of the battery. A preferable example of the content of the element A is 0.20 mol % or more and 1 mol % or less, or 0.25 mol % or more and 0.5 mol % or less.

On the surfaces of the secondary particles 37 of the composite oxide 35, at least one element B selected from the group consisting of Zr, Ti, Mn, Er, Pr, In, Sn, and Ba; and S are present. The element B and S may be present on the entire surfaces of the primary particles 36 including the inside of the secondary particles 37, similar to the element A, but are preferably substantially absent inside the secondary particles 37 and present only on the surfaces of the secondary particles 37. In this case, the amount of generation gas during storage with charged may be efficiently inhibited. It is considered that the element B and S evenly adhere onto the surfaces of the secondary particles 37 in compound states to form a coating layer 37B including the element B and S on the surfaces of the secondary particles 37.

On the surfaces of the secondary particles 37, the element B that does not form a solid solution with Ni and the like is present. Although the element B added at a small amount interacts with the element A and S to contribute to the inhibition of the gas generation, adding the element B at 0.02 mol % or more based on the total amount of moles of the metal elements excluding Li makes the effect remarkable. Meanwhile, if the content of the element B is more than 0.5 mol %, the coating layer 37B including the element B becomes a resistant layer, which lowers the discharge capacity.

The content of the element B is preferably 0.02 mol % or more and 0.5 mol % or less, more preferably 0.04 mol % or more, and particularly preferably 0.05 mol % or more, based on the total amount of moles of the metal elements excluding Li. An upper limit of the content of the element B is more preferably 0.5 mol % or less, and particularly preferably 0.3 mol % or less, from the viewpoint of achievement of both the higher capacity and good storage characteristics of the battery. A preferable example of the content of the element B is 0.02 mol % or more and 0.5 mol % or less, or 0.04 mol % or more and 0.3 mol % or less.

The element B and S are preferably present outside the element A on the surfaces of the secondary particles 37. That is, on the particle cross section of the composite oxide 35, the element B and S, and the element A are present in this order from the particle surface side with the layered shape. On the surfaces of the secondary particles 37, the coating layer 37B including the element B and S is formed so as to cover the coating layer 36A including the element A, for example. A part of the element B and S may directly adhere onto the surfaces of the secondary particles 37.

When 1 g of the composite oxide 35 is added to a mixed solution of 100 mL of pure water, 1 mL of a 35 mass % aqueous hydrochloric acid solution, 0.05 mL of a 46 mass % hydrofluoric acid, and 0.05 mL of a 64 mass % nitric acid, the mixed solution is stirred for 5 minutes, the mixed solution is subjected to filtration to obtain a filtrate, and the filtrate is analyzed by ICP-MS to determine a partial elution amount of the element A in the filtrate, and when 1 g of the composite oxide 35 is entirely dissolved to determine an entire elution amount of the element A similarly, a ratio of the partial elution amount to the entire elution amount ((the partial elution amount/the entire elution amount)×100) is preferably 60% or more, and more preferably 65% or more. The partial elution amount measured by this method indicates an amount of presence of the element A on and near the surface of the composite oxide 35 (the same applies to S and the element B). When the ratio of the elution amount of the element A satisfies the above condition, the gas generation during storage with charged is more easily inhibited than a case not satisfying the condition.

The entire elution amount of the composite oxide 35 is determined by: adding 200 mg of the composite oxide 35 into a mixed solution of 5 mL of a 35 mass % aqueous hydrochloric acid solution, 2.5 mL of a 46 mass % hydrofluoric acid, and 2.5 mL of a 64 mass % nitric acid; heating the mixed solution at approximately 90° C. for 2 hours; adding pure water to dilute the heated mixed solution to 100 mL; and determining the entire elution amount by ICP-MS.

When 1 g of the composite oxide 35 is added to a mixed solution of 100 mL of pure water, 1 mL of a 35 mass % aqueous hydrochloric acid solution, 0.05 mL of a 46 mass % hydrofluoric acid, and 0.05 mL of a 64 mass % nitric acid, the mixed solution is stirred for 5 minutes, the mixed solution is subjected to filtration to obtain a filtrate, and the filtrate is analyzed by ICP-MS to determine a partial elution amount of S in the filtrate, and when 1 g of the composite oxide 35 is entirely dissolved to determine an entire elution amount of S similarly, a ratio of the partial elution amount to the entire elution amount ((the partial elution amount/the entire elution amount)×100) is preferably 50% or more, and more preferably 55% or more. When the ratio of the elution amount of S satisfies the above condition, the gas generation during storage with charged is more easily inhibited than a case not satisfying the condition.

When 1 g of the composite oxide 35 is added to a mixed solution of 100 mL of pure water, 1 mL of a 35 mass % aqueous hydrochloric acid solution, 0.05 mL of a 46 mass % hydrofluoric acid, and 0.05 mL of a 64 mass % nitric acid, the mixed solution is stirred for 5 minutes, the mixed solution is subjected to filtration to obtain a filtrate, and the filtrate is analyzed by ICP-MS to determine a partial elution amount of the element B in the filtrate, and when 1 g of the composite oxide 35 is entirely dissolved to determine an entire elution amount of the element B similarly, a ratio of the partial elution amount to the entire elution amount ((the partial elution amount/the entire elution amount)×100) is preferably 50% u or more, and more preferably 55% or more. When the ratio of the elution amount of the element B satisfies the above condition, the gas generation during storage with charged is more easily inhibited than a case not satisfying the condition.

The composite oxide 35 may be produced by: a first step of obtaining a composite oxide including metal elements such as Ni and Al; a second step of mixing the composite oxide obtained in the first step, a compound including the element A, and a Li compound to obtain a mixture; a third step of calcining this mixture; and a fourth step of adding a compound including the element B and a compound including S to be heat-treated, for example. In the fourth step, one compound including the element B and S may be added.

In the first step, for example, with stirring a solution of metal salts including Ni, Al, and the like, a solution of an alkali such as sodium hydroxide is added dropwise in order to adjust a pH on the alkaline side (for example, 8.5 to 12.5) to precipitate (coprecipitate) a composite hydroxide including the metal elements such as Ni and Al. Then, this composite hydroxide is calcined to synthesize a composite oxide including the metal elements such as Ni and Al. The calcining temperature is not particularly limited, and for example, 300° C. or higher and 600° C. or lower.

In the second step, the composite oxide obtained in the first step, a compound including the element A. and a Li compound are mixed to obtain a mixture. An example of the compound including the element A includes $Ca(OH)_2$, CaO, $CaCO_3$, $CaSO_4$, $Ca(NO_3)_2$, $Sr(OH)_2$, $Sr(OH)_2·8H_2O$, SrO, $SrCO_3$, $SrSO_4$, and $Sr(NO_3)_2$. An example of the Li compound includes $Li_2CO_3$, LiOH, $Li_2O_2$, $Li_2O$, $LiNO_3$, $LiNO_2$, $Li_2SO_4$, $LiOH·H_2O$, LiH, and LiF.

A mixing ratio between the composite oxide obtained in the first step and the Li compound is preferably, for example, within a range of 1:0.98 to 1:1.1 of the molar ratio of the metal elements excluding Li:Li. In the second step, other metal raw materials may be added as necessary when the composite oxide obtained in the first step, the Li compound, and the compound including the element A are mixed. The other metal raw materials are oxides and the like including metal elements other than the metal elements constituting the composite oxide obtained in the first step.

In the third step, the mixture obtained in the second step is calcined under an oxygen atmosphere. This step forms the coating layer 36A including the element A on the surfaces of the primary particles 36. As an example of the calcinating conditions, a heating rate within 450° C. or higher and 680° C. or lower is 1.0° C./minute or more and 5.5° C./minute or less, and a highest reaching temperature is 700° C. or higher and 850° C. or lower. A heating rate from 680° C. to the highest reaching temperature is, for example, 0.1° C./minute or more and 3.5° C./minute or less. A holding time at the highest reaching temperature may be 1 hour or longer and 10 hours or shorter.

In the fourth step, the calcined composite oxide is mixed with a compound including the element B and S, and the mixture is heat-treated, for example. This step forms the coating layer 37B including the element B and S on the surfaces of the secondary particles 37. The calcined composite oxide obtained in the third step may be washed with water with a conventionally known method. After washing with water, the compound including the element B and S is added in a state where a powder of the composite oxide is wet, and then the heat treatment (drying) may be performed. The compound including the element B and S may be added in a powder state, or may be added in a dissolved or dispersed state in water.

Examples of the compound including the element B and S include zirconium sulfate, titanium sulfate, manganese sulfate, erbium sulfate, praseodymium sulfate, indium sulfate, tin sulfate, and barium sulfate. A compound including the element B and a compound including S may be separately added. The heat-treatment temperature is, for example, 150° C. or higher and 300° C. or lower in a vacuum atmosphere.

[Negative Electrode]

The negative electrode 12 has a negative electrode core 40 and a negative electrode mixture layer 41 provided on a surface of the negative electrode core 40. For the negative electrode core 40, a foil of a metal stable within a potential range of the negative electrode 12, such as copper, a film in which such a metal is disposed on a surface layer thereof, and the like may be used. The negative electrode mixture layer 41 includes a negative electrode active material and a binder, and is preferably provided on both surfaces of the negative electrode core 40. The negative electrode 12 may be produced by, for example, applying a negative electrode mixture slurry including the negative electrode active material, a conductive agent, the binder, and the like on the surface of the negative electrode core 40, drying and subsequently compressing the applied film to form the negative electrode mixture layers 41 on both the surfaces of the negative electrode core 40.

The negative electrode mixture layer 41 includes, for example, a carbon-based active material to reversibly occlude and release lithium ions, as the negative electrode active material. A preferable carbon-based active material is a graphite such as: a natural graphite such as flake graphite, massive graphite, and amorphous graphite; or an artificial graphite such as massive artificial graphite (MAG) and graphitized mesophase-carbon microbead (MCMB). For the negative electrode active material, a Si-based active material composed of at least one of the group consisting of Si and a Si-containing compound may also be used, and the carbon-based active material and the Si-based active material may be used in combination.

For the conductive agent included in the negative electrode mixture layer 41, a carbon material such as carbon black, acetylene black, Ketjenblack, and graphite may be used similar to that in the positive electrode 11. For the binder included in the negative electrode mixture layer 41, a fluororesin, PAN, a polyimide, an acrylic resin, a polyolefin, and the like may be used similar to that in the positive electrode 11, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR; and CMC or a salt thereof, or PAA or a salt thereof are preferably used in combination.

[Separator]

For the separator 13, a porous sheet having an ion permeation property and an insulation property is used. Specific examples of the porous sheet include a fine porous thin film, a woven fabric, and a nonwoven fabric. For a material of the separator 13, a polyolefin such as polyethylene, polypropylene, and a copolymer of ethylene and an α-olefin, cellulose, and the like are preferable. The separator 13 may have any of a single-layered structure and a multilayered structure. On a surface of the separator 13, a heat-resistant layer including inorganic particles, a heat-resistant layer composed of a highly heat-resistant resin such as an aramid resin, a polyimide, and a polyamideimide, and the like may be formed.

[Non-Aqueous Electrolyte]

The non-aqueous electrolyte includes, for example, a non-aqueous solvent and an electrolyte salt dissolved in the non-aqueous solvent. For the non-aqueous solvent, esters, ethers, nitriles such as acetonitrile, amides such as dimethylformamide, a mixed solvent of two or more thereof, and the like may be used, for example. The non-aqueous solvent may contain a halogen-substituted derivative in which hydrogen of these solvents is at least partially substituted with a halogen atom such as fluorine. Examples of the halogen-substituted derivative include fluorinated cyclic carbonates such as fluoroethylene carbonate (FEC), fluorinated chain carbonates, and fluorinated chain carboxylates such as methyl fluoropropionate (FMP).

Examples of the esters include: cyclic carbonates such as ethylene carbonate (EC), propylene carbonate (PC), and butylene carbonate; chain carbonates such as dimethyl carbonate (DMC), ethyl methyl carbonate (EMC), diethyl carbonate (DEC), methyl propyl carbonate, ethyl propyl carbonate, and methyl isopropyl carbonate: cyclic carboxylates such as γ-butyrolactone (GBL) and γ-valerolactone (GVL); and chain carboxylates such as methyl acetate, ethyl acetate, propyl acetate, methyl propionate (MP), and ethyl propionate (EP).

Examples of the ethers include: cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and a crown ether; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(CO_4)F_4)$, $LiPF_{6-x}(C_nF_{2n+1})_x$, ($1<x<6$, and n represents 1 or 2), $LiB_{10}Cl_{10}$, $LiCl$, $LiBr$, $LiI$, lithium chloroborane, a lithium lower aliphatic carboxylate, borate salts such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {l and m represent integers of 0 or more}. The lithium salts may be used singly, or a plurality types thereof may be mixed to be used. Among them, $LiPF_6$ is preferably used from the viewpoints of ion conductivity, electrochemical stability, and the like. A concentration of the lithium salt is, for example, 0.8 mol or more and 1.8 mol or less per litter of the non-aqueous solvent. Furthermore, vinylene carbonate, a propanesultone-based additive, and the like may be added.

EXAMPLES

Hereinafter, the present disclosure will be further described with Examples, but the present disclosure is not limited to these Examples.

Example 1

[Synthesis of Positive Electrode Active Material]

A composite oxide obtained by a coprecipitation method and containing Ni, Co, and Al (a molar ratio between Ni. Co, and Al was 92:4:4), calcium hydroxide, and lithium hydroxide were mixed at a predetermined mass ratio, and the mixture was heated in an oxygen flow from a room temperature to 650° C. at a beating rate of 2.0° C./minute and then calcined from 650° C. to 730° C. at a heating rate of 0.5° C./minute to obtain a calcined product. The calcined product was washed with water, then a predetermined amount of zirconium sulfate was added, and dried at 180° C. for 2 hours to obtain a lithium-transition metal composite oxide containing the elements shown in Table 1 (positive electrode active material).

[Evaluation of Elution Amount Ratios of Element A, Element B, and S]

In accordance with the above method, partial elution amounts and entire elution amounts of the elements A, B, and S in the obtained positive electrode active material were determined, and their ratios ((partial elution amount/entire elution amount)×100) were each calculated.

[Production of Positive Electrode]

The above lithium-transition metal composite oxide was used as a positive electrode active material. The positive electrode active material, acetylene black, and polyvinylidene fluoride were mixed at a predetermined solid-content mass ratio, and N-methyl-2-pyrrolidone (NMP) was used as a dispersion medium to prepare a positive electrode mixture slurry. Then, the positive electrode mixture slurry was applied on a positive electrode core made of aluminum foil, the applied film was dried and compressed, and then cut to a predetermined electrode size to obtain a positive electrode.

[Production of Negative Electrode]

A graphite, a dispersion of styrene-butadiene rubber (SBR), and sodium carboxymethylcellulose (CMC-Na) were mixed at a predetermined solid-content mass ratio, and water was used as a dispersion medium to prepare a negative electrode mixture slurry. Then, this negative electrode mixture slurry was applied on both surfaces of a negative electrode core made of copper foil, the applied film was dried and compressed, and then cut to a predetermined electrode size to produce a negative electrode in which negative electrode mixture layers were formed on both the surfaces of the negative electrode core.

[Preparation of Non-Aqueous Electrolyte Liquid]

Ethylene carbonate (EC), ethyl methyl carbonate (EMC), and dimethyl carbonate (DMC) were mixed at a predetermined volume ratio. To this mixed solvent, $LiPF_6$ was added to obtain a non-aqueous electrolyte liquid.

[Production of Test Cell (Non-Aqueous Electrolyte Secondary Battery)]

The above positive electrode to which a positive electrode lead made of aluminum was attached and the above negative electrode to which a negative electrode lead made of nickel was attached were spirally wound with a separator made of polyethylene interposed therebetween, and formed into a flat shape to produce a wound electrode assembly. This electrode assembly was housed in an exterior composed of an aluminum laminate, the above non-aqueous electrolyte liquid was injected thereinto, and an opening of the exterior was then sealed to produce a test cell for evaluation.

[Evaluation of Amount of Generation Gas During Storage with Charged]

The test cell whose volume was measured by Archimedes method was initially charged (CCCV-charged until a battery voltage of 4.2 V) under a temperature environment at 25° C., and left to stand in this charged state under a temperature environment at 60° C. for 15 days. A volume of the test cell after the storage with charged was measured by Archimedes method to calculate an amount of generation gas from the difference in the volume before and after the initial storage with charged. Table 1 shows the amount of gas generation as a value relative to an amount of gas generation of a test cell of Comparative Example 1, described later, being 100.

[Evaluation of Initial Capacity]

Under a temperature environment at 25° C., the test cell was charged at a constant current of 0.3 C until a battery voltage of 4.2 V, and then discharged at a constant current of 0.2 C until the battery voltage of 2.5 V. Table 1 shows a discharge capacity in this time as the initial capacity.

Example 2

A test cell was produced to evaluate an amount of generation gas and the like in the same manner as in Example 1 except that the addition amount of calcium hydroxide was changed in the synthesis of the positive electrode active material.

Example 3

A test cell was produced to evaluate an amount of generation gas and the like in the same manner as in Example 1 except that titanium sulfate was added instead of zirconium sulfate in the synthesis of the positive electrode active material.

Example 4

A test cell was produced to evaluate an amount of generation gas and the like in the same manner as in Example 1 except that a composite oxide containing Ni and Al (molar ratio between Ni and Al was 94:6) was used instead of the composite oxide containing Ni, Co, and Al in the synthesis of the positive electrode active material.

Example 5

A test cell was produced to evaluate an amount of generation gas and the like in the same manner as in Example 1 except that a composite oxide containing Ni and Mn (molar ratio between Ni and Mn was 94:6) was used instead of the composite oxide containing Ni, Co, and Al in the synthesis of the positive electrode active material. Table 2 shows the evaluation results. The amount of gas generation is a value relative to an amount of gas generation of a test cell of Comparative Example 5, described later, being 100.

Example 6

A test cell was produced to evaluate an amount of generation gas and the like in the same manner as in Example 1 except that strontium hydroxide was added instead of calcium hydroxide in the synthesis of the positive electrode active material. Table 2 shows the evaluation results. The amount of gas generation is a value relative to an amount of gas generation of a test cell of Comparative Example 5, described later, being 100.

Example 7

A test cell was produced to evaluate an amount of generation gas and the like in the same manner as in Example 1 except that a composite oxide containing Ni, Co, and Al (molar ratio between Ni, Co, and Al was 83:14:6) was used instead of the composite oxide containing Ni, Co, and Al in the synthesis of the positive electrode active material. Table 3 shows the evaluation results. The amount of gas generation is a value relative to an amount of gas generation of a test cell of Comparative Example 7, described later, being 100.

Comparative Example 1

A test cell was produced to evaluate an amount of generation gas and the like in the same manner as in Example 1 except that no zirconium sulfate was added in the synthesis of the positive electrode active material.

Comparative Example 2

A test cell was produced to evaluate an amount of generation gas and the like in the same manner as in Comparative Example 1 except that the addition amount of calcium hydroxide was changed in the synthesis of the positive electrode active material.

Comparative Example 3

A test cell was produced to evaluate an amount of generation gas and the like in the same manner as in Example 1 except that neither calcium hydroxide nor zirconium sulfate was added in the synthesis of the positive electrode active material.

Comparative Example 4

A test cell was produced to evaluate an amount of generation gas and the like in the same manner as in Comparative Example 1 except that a composite oxide containing Ni and Al (molar ratio between Ni and Al was 94:6) was used instead of the composite oxide containing Ni, Co, and Al in the synthesis of the positive electrode active material.

Comparative Example 5

A test cell was produced to evaluate an amount of generation gas and the like in the same manner as in Comparative Example 1 except that a composite oxide containing Ni and Mn (molar ratio between Ni and Mn was 94:6) was used instead of the composite oxide containing Ni, Co, and Al in the synthesis of the positive electrode active material.

Comparative Example 6

A test cell was produced to evaluate an amount of generation gas and the like in the same manner as in Comparative Example 1 except that strontium hydroxide was added instead of calcium hydroxide in the synthesis of the positive electrode active material.

Comparative Example 7

A test cell was produced to evaluate an amount of generation gas and the like in the same manner as in Example 7 except that no zirconium sulfate was added in the synthesis of the positive electrode active material.

15                                                                                              16

Comparative Example 8

A test cell was produced to evaluate an amount of generation gas and the like in the same manner as in Comparative Example 1 except that zirconium oxide was added instead of zirconium sulfate in the synthesis of the positive electrode active material.

Comparative Example 9

A test cell was produced to evaluate an amount of generation gas and the like in the same manner as in Comparative Example 1 except that lithium sulfate was added instead of zirconium sulfate in the synthesis of the positive electrode active material.

TABLE 1

| | Positive electrode active material | | | | | | | | | | | | Evaluation | |
| | Major metal elements (mol %/active material) | | | | Element A (mol %/transition metal) | | Element B (mol %/transition metal) | | Partial elution amount/ Entire elution amount (%) | | | Amount of | |
| | | | | | Ca addition | Sr addition | | Addition | | | | generation | Initial |
| | Ni | Co | Al | Mn | amount | amount | Additive | amount | Element A | Element B | S | gas | capacity |
|---|---|---|---|---|---|---|---|---|---|---|---|---|---|
| Exmample 1 | 92 | 4 | 4 | — | 0.25 | — | Zr sulfate | 0.1 | 77 | 59 | 62 | 63 | 231 |
| Exmample 2 | 92 | 4 | 4 | — | 0.5 | — | Zr sulfate | 0.1 | 80 | 60 | 64 | 61 | 231 |
| Exmample 3 | 92 | 4 | 4 | — | 0.25 | — | Ti sulfate | 0.1 | 84 | 52 | 54 | 62 | 232 |
| Exmample 4 | 92 | 4 | 4 | — | — | 0.25 | Zr sulfate | 0.1 | 79 | 62 | 65 | 64 | 231 |
| Comparative Example 1 | 92 | 4 | 4 | — | 0.25 | — | — | — | 79 | — | — | 100 | 232 |
| Comparative Example 2 | 92 | 4 | 4 | — | 0.5 | — | — | — | 78 | — | — | 99 | 232 |
| Comparative Example 3 | 92 | 4 | 4 | — | — | — | — | — | — | — | — | 101 | 231 |
| Comparative Example 4 | 92 | 4 | 4 | — | — | 0.25 | — | — | 79 | — | — | 101 | 232 |
| Comparative Example 8 | 92 | 4 | 4 | — | 0.25 | — | Zr oxide | 0.1 | 80 | 62 | — | 99 | 231 |
| Comparative Example 9 | 92 | 4 | 4 | — | 0.25 | — | Li sulfate | 0.1 | 79 | — | — | 101 | 232 |

TABLE 2

| | Positive electrode active material | | | | | | | | | | | | Evaluation | |
| | Major metal elements (mol %/active material) | | | | Element A (mol %/transition metal) | | Element B (mol %/transition metal) | | Partial elution amount/ Entire elution amount (%) | | | Amount of | |
| | | | | | Ca addition | Sr addition | | Addition | | | | generation | Initial |
| | Ni | Co | Al | Mn | amount | amount | Additive | amount | Element A | Element B | S | gas | capacity |
|---|---|---|---|---|---|---|---|---|---|---|---|---|---|
| Exmample 5 | 94 | — | 6 | — | 0.25 | — | Zr sulfate | 0.1 | 79 | 61 | 63 | 61 | 236 |
| Exmample 6 | 94 | — | — | 6 | 0.25 | — | Zr sulfate | 0.1 | 80 | 61 | 62 | 63 | 237 |
| Comparative Example 5 | 94 | — | 6 | — | 0.25 | — | — | — | 77 | — | — | 100 | 237 |
| Comparative Example 6 | 94 | — | — | 6 | 0.25 | — | — | — | 79 | — | — | 101 | 237 |

TABLE 3

| | Positive electrode active material | | | | | | | | | | | | Evaluation | |
| | Major metal elements (mol %/active material) | | | | Element A (mol %/transition metal) | | Element B (mol %/transition metal) | | Partial elution amount/ Entire elution amount (%) | | | Amount of | |
| | | | | | Ca addition | Sr addition | | Addition | | | | generation | Initial |
| | Ni | Co | Al | Mn | amount | amount | Additive | amount | Element A | Element B | S | gas | capacity |
|---|---|---|---|---|---|---|---|---|---|---|---|---|---|
| Exmample 7 | 83 | 14 | 3 | — | 0.25 | — | Zr sulfate | 0.1 | 80 | 59 | 60 | 64 | 232 |
| Comparative Example 7 | 83 | 14 | 3 | — | 0.25 | — | — | — | 79 | — | — | 100 | 222 |

As shown in Tables 1 to 3, any of the test cells of Examples generate a smaller amount of gas during storage with charged than the test cells of Comparative Examples, and have excellent storage characteristics. From the results shown in Tables 1 to 3, using each of the positive electrode active material in which all of the element A, the element B, and S are absent on the surfaces of the primary particle of the lithium-transition metal composite oxide (Comparative Example 3), the positive electrode active materials in which the element B and S are absent on the surfaces of the secondary particles (Comparative Examples 1 to 7 and 9), and the positive electrode active material in which only S is absent (Comparative Examples 8), the amount of generation gas during storage with charged increases. That is, it is considered that the interaction between the element A, the element B, and S improves the stability of the active material surface to specifically inhibit the gas generation during storage with charged.

Examples 8 to 10

A test cell was produced to evaluate an amount of generation gas and the like in the same manner as in Example 1 except that the addition amount of calcium hydroxide was changed so that the element A had an amount shown in Table 4 in the synthesis of the positive electrode active material. The amount of gas generation is a value relative to the amount of gas generation of the test cell of Comparative Example 1 being 100.

Examples 11 to 14

A test cell was produced to evaluate an amount of generation gas and the like in the same manner as in Example 1 except that the addition amount of zirconium sulfate was changed so that the element B and S had amounts shown in Table 4 in the synthesis of the positive electrode active material. The amount of gas generation is a value relative to the amount of gas generation of the test cell of Comparative Example 1 being 100.

effect of inhibition of the gas generation but lowers the initial capacity of the battery (Example 14), similar to the case where an excessive amount of the element A is added. That is, to inhibit the gas generation during storage with charged without impairing the other battery performances, it is important to control the element A, the element B, and S with the appropriate amounts.

REFERENCE SIGNS LIST

10 Non-aqueous electrolyte secondary battery
11 Positive electrode
12 Negative electrode
13 Separator
14 Electrode assembly
16 Exterior housing can
17 Sealing assembly
18, 19 Insulating plate
20 Positive electrode lead
21 Negative electrode lead
22 Groove
23 Internal terminal plate
24 Lower vent member
25 Insulating member
26 Upper vent member
27 Cap
28 Gasket
30 Positive electrode core
31 Positive electrode mixture layer
35 Lithium-transition metal composite oxide (Composite oxide)
36 Primary particle
36A, 37B Coating layer
37 Secondary particle
40 Negative electrode core
41 Negative electrode mixture layer

The invention claimed is:
1. A positive electrode active material for a non-aqueous electrolyte secondary battery, including a lithium-transition

TABLE 4

| | Positive electrode active material | | | | | | | | | | | | |
| | Major metal elements (mol %/active material) | | | | Element A (mol %/transition metal) | | Element B (mol %/transition metal) | | Partial elution amount/ Entire elution amount (%) | | | Evaluation | |
| | | | | | Ca addition | Sr addition | | Addition | | | | Amount of generation | Initial |
| | Ni | Co | Al | Mn | amount | amount | Additive | amount | Element A | Element B | S | gas | capacity |
|---|---|---|---|---|---|---|---|---|---|---|---|---|---|
| Exmample 8 | 92 | 4 | 4 | — | 0.05 | — | Zr sulfate | 0.1 | 84 | 61 | 64 | 98 | 232 |
| Exmample 9 | 92 | 4 | 4 | — | 1 | — | Zr sulfate | 0.1 | — | — | — | 74 | 228 |
| Exmample 10 | 92 | 4 | 4 | — | 2 | — | Zr sulfate | 0.1 | — | — | — | 68 | 222 |
| Exmample 11 | 92 | 4 | 4 | — | 0.25 | — | Zr sulfate | 0.05 | 82 | 94 | 63 | 70 | 232 |
| Exmample 12 | 92 | 4 | 4 | — | 0.25 | — | Zr sulfate | 0.5 | — | — | — | 59 | 229 |
| Exmample 13 | 92 | 4 | 4 | — | 0.25 | — | Zr sulfate | 1 | — | — | — | 55 | 224 |
| Exmample 14 | 92 | 4 | 4 | — | 0.25 | — | Zr sulfate | 2 | — | — | — | 50 | 220 |

As shown in Table 4, both of the initial capacity and good storage characteristics can be achieved when the predetermined amount of the element A is included. However, observed tendency is that a small amount of the element A yields insufficient effect of inhibition of the gas generation, and an excessive amount of the element A yields the effect of inhibition of the gas generation but lowers the initial capacity of the battery (Examples 8 to 10). Also observed tendency is that a large amount of the element B yields the metal composite oxide containing 80 mol % or more of Ni based on a total amount of moles of metal elements excluding Li, wherein the lithium-transition metal composite oxide includes secondary particles formed by aggregation of primary particles, at least one element A selected from the group consisting of Ca and Sr is present on surfaces of the primary particles in an amount of 3 mol % or less based on the total amount of moles of the metal elements excluding Li, at least one element B selected from the group consisting of Zr, Ti, Mn, Er, Pr, In, Sn, and Ba; and S are present on surfaces of the secondary particles, and a first coating layer including the element A and a second coating layer formed to cover the first coating layer and including the element B and S are formed on surfaces of the secondary particles.

2. The positive electrode active material for a non-aqueous electrolyte secondary battery according to claim 1, wherein the lithium-transition metal composite oxide contains at least one selected from the group consisting of Co, Al, and Mn, and a content of the element A is 0.1 mol % or more and 0.5 mol % or less based on the total amount of moles of the metal elements excluding Li.

3. The positive electrode active material for a non-aqueous electrolyte secondary battery according to claim 1, wherein the element B is at least one selected from the group consisting of Zr and Ti, and is present in an amount of 0.02 mol % or more and 0.5 mol % or less based on the total amount of moles of the metal elements excluding Li.

4. The positive electrode active material for a non-aqueous electrolyte secondary battery according to claim 1, wherein when 1 g of the lithium-transition metal composite oxide is added to a mixed solution of 100 mL of pure water, 1 mL of a 35 mass % aqueous hydrochloric acid solution, 0.05 mL of a 46 mass % hydrofluoric acid, and 0.05 mL of a 64 mass % nitric acid, the mixed solution is stirred for 5 minutes, the mixed solution is subjected to filtration to obtain a filtrate, and the filtrate is analyzed by inductively coupled plasma mass spectroscopy to determine partial elution amounts of S and the element B in the filtrate, and when 1 g of the lithium-transition metal composite oxide is entirely dissolved to determine entire elution amounts of S and the element B similarly, each ratio of the partial elution amount to the entire elution amount ((the partial elution amount/the entire elution amount)×100) is 50% or more.

5. The positive electrode active material for a non-aqueous electrolyte secondary battery according to claim 1, wherein when 1 g of the lithium-transition metal composite oxide is added to a mixed solution of 100 mL of pure water, 1 mL of a 35 mass % aqueous hydrochloric acid solution, 0.05 mL of a 46 mass % hydrofluoric acid, and 0.05 mL of a 64 mass % nitric acid, the mixed solution is stirred for 5 minutes, the mixed solution is subjected to filtration to obtain a filtrate, and the filtrate is analyzed by inductively coupled plasma mass spectroscopy to determine a partial elution amount of the element A in the filtrate, and when 1 g of the lithium-transition metal composite oxide is entirely dissolved to determine an entire elution amount of the element A similarly, a ratio of the partial elution amount to the entire elution amount ((the partial elution amount/the entire elution amount)×100) is 60% or more.

6. A non-aqueous electrolyte secondary battery, comprising:

a positive electrode including the positive electrode active material according to claim 1;

a negative electrode; and a non-aqueous electrolyte.

7. A positive electrode active material for a non-aqueous electrolyte secondary battery, including a lithium-transition metal composite oxide containing 80 mol % or more of Ni based on a total amount of moles of metal elements excluding Li, wherein the lithium-transition metal composite oxide includes secondary particles formed by aggregation of primary particles, at least one element A selected from the group consisting of Ca and Sr is present on surfaces of the primary particles in an amount of 3 mol % or less based on the total amount of moles of the metal elements excluding Li, at least one element B selected from the group consisting of Ti, Mn, Er, Pr, In, Sn, and Ba; and S are present on surfaces of the secondary particles, and the element B is only present on surfaces of the secondary particles but is absent inside the secondary particles.

8. The positive electrode active material for a non-aqueous electrolyte secondary battery according to claim 7, wherein the lithium-transition metal composite oxide contains at least one selected from the group consisting of Co, Al, and Mn, and a content of the element A is 0.1 mol % or more and 0.5 mol % or less based on the total amount of moles of the metal elements excluding Li.

9. The positive electrode active material for a non-aqueous electrolyte secondary battery according to claim 7, wherein the element B is Ti, and is present in an amount of 0.02 mol % or more and 0.5 mol % or less based on the total amount of moles of the metal elements excluding Li.

10. The positive electrode active material for a non-aqueous electrolyte secondary battery according to claim 7, wherein when 1 g of the lithium-transition metal composite oxide is added to a mixed solution of 100 mL of pure water, 1 mL of a 35 mass % aqueous hydrochloric acid solution, 0.05 mL of a 46 mass % hydrofluoric acid, and 0.05 mL of a 64 mass % nitric acid, the mixed solution is stirred for 5 minutes, the mixed solution is subjected to filtration to obtain a filtrate, and the filtrate is analyzed by inductively coupled plasma mass spectroscopy to determine partial elution amounts of S and the element B in the filtrate, and when 1 g of the lithium-transition metal composite oxide is entirely dissolved to determine entire elution amounts of S and the element B similarly, each ratio of the partial elution amount to the entire elution amount ((the partial elution amount/the entire elution amount)×100) is 50% or more.

11. The positive electrode active material for a non-aqueous electrolyte secondary battery according to claim 7, wherein when 1 g of the lithium-transition metal composite oxide is added to a mixed solution of 100 mL of pure water, 1 mL of a 35 mass % aqueous hydrochloric acid solution, 0.05 mL of a 46 mass % hydrofluoric acid, and 0.05 mL of a 64 mass % nitric acid, the mixed solution is stirred for 5 minutes, the mixed solution is subjected to filtration to obtain a filtrate, and the filtrate is analyzed by inductively coupled plasma mass spectroscopy to determine a partial elution amount of the element A in the filtrate, and when 1 g of the lithium-transition metal composite oxide is entirely dissolved to determine an entire elution amount of the element A similarly, a ratio of the partial elution amount to the entire elution amount ((the partial elution amount/the entire elution amount)×100) is 60% or more.

12. A non-aqueous electrolyte secondary battery, comprising:

a positive electrode including the positive electrode active material according to claim 7;

a negative electrode; and a non-aqueous electrolyte.

* * * * *